G. L. CUMMINGS.
ICE CUTTER.
No. 85,217. Patented Dec. 22, 1868.
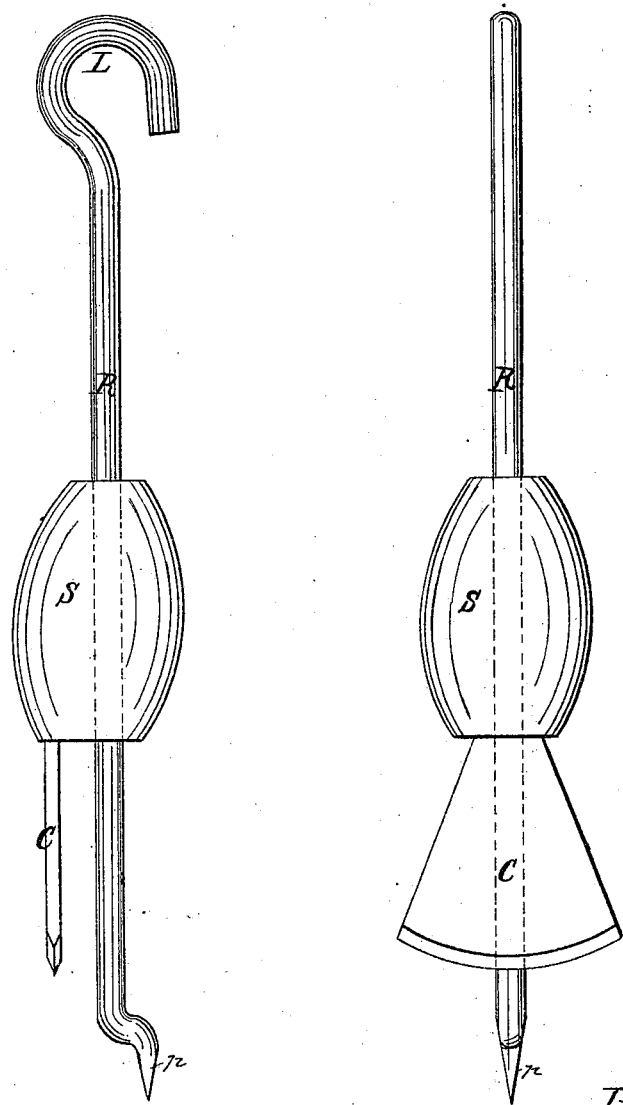

GEORGE L. CUMMINGS, OF NEW YORK, N. Y.

Letters Patent No. 85,217, dated December 22, 1868; antedated December 15, 1868.

IMPROVED ICE-CUTTER.

The Schedule referred to in these Letters Patent and making part of the same.

*To all whom it may concern:*

Be it known that I, GEORGE L. CUMMINGS, of the city, county, and State of New York, have invented a new and improved Implement for Cutting Ice.

My implement is intended to do the work which is now done by breaking, but with less loss, and in a better way.

This effect has been produced by machinery, but not in the manner produced by mine.

I hereby declare that the following is a full, clear, and exact description of my device, reference being had to the accompanying drawings, and to the letters of reference marked thereon, in which—

Figure 1 is a side elevation, showing the edge of the cutter and the form of the guide-rod.

Figure 2 is a front view of the same.

Similar letters of reference indicate like parts in both figures.

It is necessary, in using ice, and perhaps other similarly-formed substances, to be able to cut them to the desired size and shape, instead of trusting to their breaking in the required form.

To enable others skilled in the art to make and use my invention, I will proceed to describe its construction and operation by the aid of the drawings.

I prepare a rod, R, of iron or steel, crooked and pointed at its lower extremity, as shown at *p*, which point may be hardened, if desired. This I make of, say, five-sixteenths inch square or round iron or steel, of from twelve to eighteen inches long.

On this rod I slip the weight S, which is of cast-iron, or other material of sufficient strength, having a hole through it of such size and shape as to allow it to move freely along the rod R.

Secured to the lower end of this weight is the cutter C, of steel, or other sufficiently-hard material, sharpened, and of the form of an ordinary hatchet.

The rod R is then bent, as at L, so as to prevent the sliding piece S from slipping off. The hook L also answers to hang the instrument up by.

The manner of operating with this instrument is as follows:

Holding the rod, by the hook L, with one hand, place the point *p* the proper distance from the place desired to be cut, with the other hand, and move the weight S up and down upon the ice until it is cracked.

I do not claim the pointed rod; neither do I claim a weight striking on a shoulder to force a point into the ice; but What I do claim, and desire to secure by Letters Patent, is—

The combination of the guide-rod R, the weight S, and the flat cutter C, attached to the weight, as and for the purpose specified.

GEO. L. CUMMINGS.

Witnesses:
 J. B. WARING,
 CYRUS THOMPSON.